July 11, 1944.  H. O. DROTNING  2,353,227
CAMERA ADJUSTING MECHANISM
Filed Sept. 26, 1942
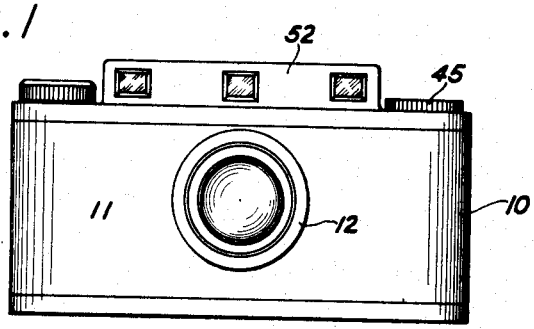
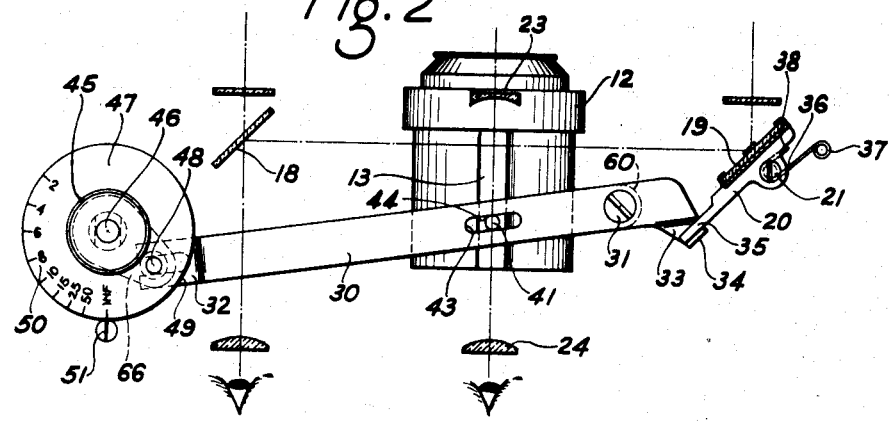
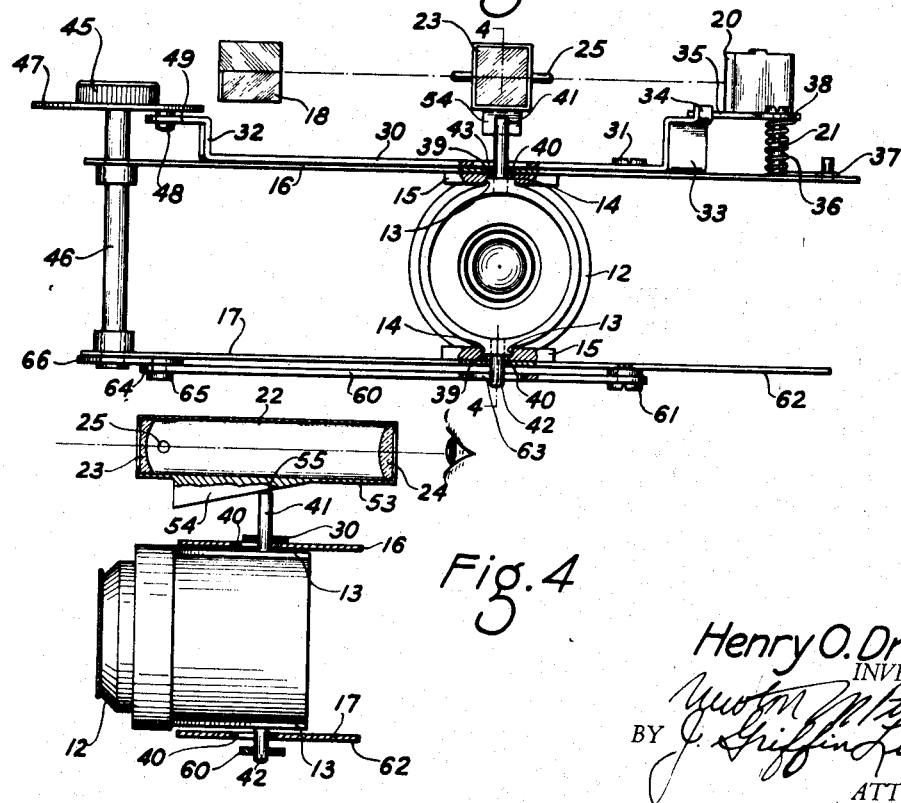
Henry O. Drotning
INVENTOR
BY
ATTORNEYS Patented July 11, 1944

2,353,227

UNITED STATES PATENT OFFICE 2,353,227

CAMERA ADJUSTING MECHANISM

Henry O. Drotning, Rochester, N. Y., assignor to Eastman Kodak Company, Rochester, N. Y., a corporation of New Jersey Application September 26, 1942, Serial No. 459,855

8 Claims. (Cl. 95—44)

The present invention relates to photographic cameras, and more particularly to adjusting mechanisms for cameras of the focusing type.

One object of the invention is the provision of a coupling arrangement between an axially movable lens barrel and range and view finder elements so constructed that axial movement of the lens barrel will automatically and simultaneously adjust the range finder and the view finder in proper relation to the movement of the lens barrel.

Another object of the invention is the provision of such a coupling arrangement which is simple in construction, inexpensive to manufacture, easy to operate, and highly effective in use.

To these and other ends, the invention resides in certain improvements and combinations of parts, all as will be hereinafter more fully described, the novel features being pointed out in the claims at the end of the specification.

In the drawing:

Fig. 1 is a front view of a camera showing the relation of the lens barrel and the range and view finders, Fig. 2 is a plan view of a coupling for operatively connecting the lens barrel to the range and view finders, as constructed in accordance with the present invention, Fig. 3 is a front view of the coupling mechanism illustrated in Fig. 2; and Fig. 4 is a side elevation view through the mechanism illustrated in Fig. 3 and taken substantially on line 4—4 of Fig. 3, showing the operative connection between the lens barrel, view finder and the coupling mechanism.

Similar reference numerals throughout the various views indicate the same parts.

Fig. 1 shows a camera 10 in the front wall 11 of which is slidably mounted a lens barrel 12 in which the objective lenses and shutter, not shown, are housed. Focusing is secured by sliding the lens barrel axially relative to the front wall 11, as is well known in cameras of this type. In order to retain the lens barrel in proper alignment during such axial movement, the barrel 12 is provided with a pair of diametrically arranged lugs 13 arranged to slide in corresponding shaped recesses 14 formed in guides 15 suitably secured to a pair of spaced parallel plates 16 and 17 positioned adjacent or forming the opposite side walls of the camera body. A coincidence range finder is mounted on the top of the camera and comprises a fixed semitransparent mirror 18 and an adjustable mirror 19 secured to a bracket 20 pivotally mounted on a stud 21 projecting upwardly from the plate 16, as best shown in Fig. 3. A view finder is also mounted on top of the camera, and in horizontal alignment with the range finder mirrors, and comprises a tubular body 22 in which are mounted a pair of lenses 23 and 24 arranged in a manner clearly shown in Fig. 4. As the range finder and view finder are of well-known construction, further detailed descriptions are not deemed necessary. The view finder is mounted for pivoting or tilting movement about a pin or stud 25 so that the view finder may be tilted to compensate for parallax, for reasons well known to those in the art and in a manner to be later described.

In cameras of this type, it is desirable to operatively couple the movable mirror 19 of the range finder to the lens barrel 12 so that the range finder will be adjusted simultaneously with the movement of the lens barrel and in proper relation therewith. To secure this result, the present invention provides a lever 30 pivoted at 31 on the plate 16 and having the opposite ends 32 and 33 thereof bent upwardly, as best shown in Fig. 3. The end 33 of the lever 30 is provided with a lug or cam 34 adapted to engage the end 35 of bracket 20 which carries the movable range finder mirror 19. A coil spring 36 is wrapped around the stud 21 and has one end 37 anchored to the plate 16, and the other end secured to the bracket 20 to retain the latter in engagement with the lug 34. The upper and lower guides 15 are formed with axially extending slots 39 which register with similarly shaped slots 40 formed in the plates 16 and 17. A pair of diametrically arranged pins 41 and 42 project radially from the lens barrel 12 and through the lugs 13 and the registering slots 39 and 40, as best shown in Fig. 3. These pins 41 and 42 and the slots 39 and 40 thus cooperate with the lugs 13 and recesses 14 to maintain the lens barrel in alignment during the axial movement, and effectively prevent any cocking or tilting movement of the lens barrel, the advantages of which will be readily apparent to those in the art. The upper pin 41 extends through an aligned elongated aperture 43 formed in the lever 30 to operatively connect the latter to the lens barrel 12. This lever 30 thus effectively couples the lens barrel to the range finder mirror 19.

It is now apparent from an inspection of Fig. 2 that if the lever 30 is moved or rocked in either direction about its pivot 31, one of the edges of the aperture 43 will engage the upper pin 41 to move the lens barrel 12 axially to focus the camera. Such movement of the lever 30 will also simultaneously cause the lug 34 to pivot the bracket 20 to adjust the pivoted or movable mirror 19 of the range finder in proper relation relative to the direction and amount of movement of the lens barrel 12.

The lever 30 may be moved or rocked in any suitable manner. Such rocking means comprises, in the present embodiment, a knob 45 carried by a shaft 46 journaled in the spaced plates 16 and 17. The knob 45 has secured thereto a plate 47 having a depending pin 48 adapted to be positioned in a forked portion 49 formed on the upturned end 32 of the lever 30, as best shown in Fig. 3. By means of this arrangement, the lever 30 is connected to the knob 45 so that any rotative movement of the latter will impart a pivoting or rocking movement to the lever 30 to simultaneously move the lens barrel 12 axially, and to pivot the mirror 19 to properly adjust the range finder. The plate 47 may carry a focusing scale 50 adapted to cooperate with a fixed line 51 to indicate the focusing adjustment.

A suitable housing 52 encloses the range and view finders and the pivoted lever 30. This housing is provided with suitable openings, not designated, arranged in alignment with the various range and view finder elements, as will be apparent from an inspection of Fig. 1.

The above-described coupling thus operatively connects the lens barrel and the range finder so that these elements will be properly and simultaneously adjusted. However, in order to compensate for parallax, the view finder should be tilted varying amounts for different adjustments of the lens barrel, as is well known. In order that such tilting of the view finder will be in proper relation to the positioning of the lens barrel, the present invention also provides an arrangement for coupling the view finder to the lens barrel so that these members will be simultaneously moved and in proper relation to each other. To this end, the under surface 53 of the tubular view finder 22 is provided with an inclined cam 54 adapted to ride on the upper end 55 of the pin 41, as clearly shown in Fig. 4. Now if the lever 30 is moved in a clockwise direction, as viewed in Fig. 2, the lens barrel 12 will move forwardly or to the left as viewed in Fig. 4. Such movement of the lens barrel will cause the end 55 of the pin 41 to ride along the cam 54 to tilt the tubular lens barrel 22 in a counterclockwise direction about the pivot 25. A rightward movement of the lens barrel, as viewed in Fig. 4, will, on the other hand, cause the end 55 of the pin 41 to ride to the right along the cam 54 to permit the tubular view finder 22 to move in a clockwise direction about the pivot 26. By means of this arrangement, the view finder is coupled to the lens barrel and the range finder to move simultaneously with and to be properly adjusted both in direction and amount relative to the movement of the lens barrel to compensate for parallax.

While the lugs 13 and the recesses 14 cooperate with the upper pin 41 and aperture 43 to effectively maintain the lens barrel 12 in axial alignment to prevent cocking or tilting thereof, additional steadying and aligning means may be provided, if desired. This additional auxiliary means comprises, in the present embodiment, a second lever 60 pivoted at 61 to the under surface 62 of the lower plate 17 and in vertical alignment with the pivot 31 of the lever 30 as clearly illustrated in Fig. 3. This lever 60 is formed with an elongated aperture 63 through which the lower pin 42 of the lens barrel 12 projects. The left end of the lever 60 is formed with an open end slot 64 adapted to receive a depending pin 65 formed on the end of a crank arm 66 secured to the lower end of the shaft 46, all as clearly shown in Fig. 3. Thus the lever 60 is also operatively connected to the shaft 46 and will move in parallel relation with the lever 30 upon rotation of the shaft 46 to axially adjust the lens barrel 12, and to prevent cocking or tilting thereof.

It is thus apparent from the above description that the present invention provides a coupling between the axially movable lens barrel and the range and view finders whereby these elements are all moved simultaneously and in proper relation. This coupling is of extreme simplicity, is inexpensive to manufacture, and is very effective in use. The spring 36 maintains the end of the bracket 20 in engagement with the cam 46 to take up any back lash or lost motion between the various parts of the mechanism thus insuring that all parts will not only move simultaneously but will all move relatively the proper amount and in the proper direction.

While one embodiment of the invention has been disclosed, it is to be understood that the inventive idea may be carried out in a number of ways. This application is, therefore, not to be limited to the precise details described, but is intended to cover all variations and modifications thereof falling within the scope of the appended claims.

I claim:

1. In a photographic camera, the combination with an axially movable objective lens barrel, a coincidence range finder comprising a pivoted ray deflecting mirror and a tiltable view finder all mounted on said camera, of a single lever pivoted on said camera and operatively connected to said barrel said mirror and said finder, an adjusting member independent of said barrel and connected directly to said lever to pivot the latter to move simultaneously said barrel axially for focusing, to pivot said mirror to adjust said range finder in accordance with the axial movement of said barrel and to tilt said view finder to compensate for parallax between said finder and said lens barrel, and cooperating means on said adjusting member and said camera to indicate the focusing adjustment.

2. In a photographic camera, the combination with an axially movable objective lens barrel, a coincidence range finder comprising a pivoted ray deflecting mirror and a tiltable view finder all mounted on said camera, of a single lever pivotally mounted on said camera and operatively connected to said barrel said mirror and said finder, an operating knob carried by said camera, and means for connecting said knob to said lever so that rotative movement of said knob will rock said lever to move simultaneously said barrel axially for focusing, to pivot said mirror to adjust said range finder in proper relation to the movement of said barrel and to tilt said view finder to compensate for parallax between said finder and said lens barrel.

3. In a photographic camera, the combination with an axially movable objective lens barrel, a coincidence range finder comprising a pivoted ray deflecting mirror and a tiltable view finder all mounted on said camera, of a support for said barrel formed with an axially extending slot, a lever pivotally mounted on said camera and formed with an aperture positioned above and in registry with said slot, a connection between said lever and said mirror, a pin projecting from said barrel and extending through said slot and said aperture and above said lever, a cam carried by said finder and engaging said pin, and means operatively connected to said lever to rock the latter to move said pin along said slot to focus said barrel and to move said connection to pivot said mirror to adjust said range finder in proper relation to the movement of said barrel and to move said pin along said cam to tilt said finder to compensate for parallax between said finder and said lens barrel.

4. In a photographic camera, the combination with an axially movable objective lens barrel, a coincidence range finder comprising a pivoted ray deflecting mirror and a tiltable view finder all mounted on said camera, of a plate carried by said camera and formed with an axially extending slot, a guide for said lens barrel formed with a slot registering with said slot in said plate, a lever pivotally connected to said plate and formed with an aperture overlying and registering with said slots, a portion of said lever engaging said mirror and adapted to pivot the latter, a pin on said barrel projecting through said slots and said aperture, an inclined cam formed on said finder and engaging said pin so that axial movement of said barrel will move said pin along said cam to tilt said finder, and a knob connected to said lever and arranged to rock the latter about its pivot to move said pin along said slots to axially adjust said barrel for focusing, to move said portion to pivot said mirror to adjust said range finder in proper relation relative to the movement of said barrel and to move said pin along said cam to tilt said finder to compensate for parallax between said finder and lens barrel.

5. In a photographic camera, the combination with an axially movable objective lens barrel, a coincidence range finder comprising a pivoted ray deflecting mirror and a tiltable view finder all mounted on said camera, a pair of spaced plates carried by said camera and formed with aligned axially extending slots, guides for said lens barrel carried by said plates and formed with slots registering with said first mentioned slots, a lever pivotally mounted on each of said plates and formed with an elongated aperture overlying and registering with the slots in the adjacent plate and guide, pins projecting radially from said barrel and extending through said slots and apertures to operatively connect said barrel to said levers a shaft carried by said plates, means for operatively connecting said shaft to said levers so that rotative movement of said shaft will simultaneously rock said levers about said pivots to move said pins along said slots to axially adjust said barrel for focusing, an operating knob connected to said shaft to impart rotative movement thereto, a portion of one of said levers engaging said mirror so that the rocking movement of said one lever will pivot said mirror to adjust said range finder in proper relation to the axial movement of said barrel, and a cam formed on said range finder and adapted to engage the pin projecting through said one lever so that upon rocking the latter said last mentioned pin will ride along said cam to tilt said finder to compensate for parallax between said finder and said lens barrel.

6. In a photographic camera, the combination with an axially movable objective lens barrel, a coincidence range finder comprising a pivoted ray deflecting mirror and a tiltable view finder all mounted on said camera, of a pair of parallel levers rockably mounted on said camera, means for operatively connecting said levers to said lens barrel, means for operatively connecting one of said levers to said mirror, means to operatively connect one of said levers to said finder, and means for moving said levers simultaneously in parallel relation to move said lens barrel axially for focusing, to pivot said mirror to adjust said range finder in accordance with the axial movement of said lens barrel and to tilt said finder to compensate for parallax between said finder and said lens barrel.

7. In a photographic camera, the combination with an axially movable objective lens barrel, a coincidence range finder comprising a pivoted ray deflecting mirror, and a tiltable view finder all mounted on said camera, of a pair of spaced parallel levers pivotally mounted on said camera, a pair of pins projecting radially from said lens barrel and engaging said levers to separately connect said levers to said lens barrel, means on one of said levers for operatively connecting the latter to said mirror, means on said finder engaging one of said pins to operatively connect said finder to said lens barrel and said one of said levers, and an operating knob connected to both of said levers to rock said levers in parallel relation simultaneously to move said lens barrel axially for focusing to pivot said mirror to adjust said range finder in accordance with the axial movement of said lens barrel and to tilt said finder to compensate for parallax between said finder and said lens barrel.

8. In a photographic camera, the combination with an axially movable objective lens barrel, a coincidence range finder comprising a pivoted ray deflecting mirror, and a tiltable view finder all mounted on said camera, of a pair of spaced parallel levers pivotally mounted on said camera, a pair of diametrically arranged pins projecting radially from said lens barrel and extending through apertures formed in said levers to separately and independently connect said levers to said lens barrel, cooperating portions for operatively connecting one of said levers to said mirror, a cam carried by said finder and engaging one of said pins, a shaft, means for connecting said shaft to both of said levers, means for imparting a rotative movement to said shaft to rock said levers in parallel relation to move said pins to shift said lens barrel axially for focusing, to actuate said cooperating portions to pivot said mirror to adjust said range finder in accordance with the axial movement of said lens barrel and to move said one pin along said cam to tilt said finder to compensate for parallax between said lens barrel and said finder, and means for retaining the various members in engagement to take up any play therebetween.

HENRY O. DROTNING.